(12) United States Patent
Fahrig et al.

(10) Patent No.: US 9,086,922 B2
(45) Date of Patent: Jul. 21, 2015

(54) OPPORTUNISTICALLY SCHEDULING AND ADJUSTING TIME SLICES

(75) Inventors: Thomas Fahrig, Redmond, WA (US); David Cutler, Medina, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 909 days.

(21) Appl. No.: 12/605,953

(22) Filed: Oct. 26, 2009

(65) Prior Publication Data

US 2011/0099551 A1 Apr. 28, 2011

(51) Int. Cl.
*G06F 9/46* (2006.01)
*G06F 9/50* (2006.01)
*G06F 9/52* (2006.01)

(52) U.S. Cl.
CPC ............ *G06F 9/5038* (2013.01); *G06F 9/5077* (2013.01); *G06F 9/526* (2013.01); *G06F 2209/506* (2013.01)

(58) Field of Classification Search
CPC ...... G06F 9/5027; G06F 9/5077; G06F 9/455
See application file for complete search history.

(56) References Cited

U.S. PATENT DOCUMENTS

| | | | |
|---|---|---|---|
| 5,193,186 A | 3/1993 | Tamaki | |
| 5,524,247 A | 6/1996 | Mizuno | |
| 6,567,873 B1 | 5/2003 | Henriksen | |
| 7,159,216 B2 | 1/2007 | McDonald | |
| 2004/0268347 A1* | 12/2004 | Knauerhase et al. | 718/1 |
| 2007/0050527 A1 | 3/2007 | Tuan | |
| 2008/0168447 A1* | 7/2008 | Lewis | 718/102 |
| 2010/0211959 A1* | 8/2010 | Chan et al. | 718/107 |

OTHER PUBLICATIONS

Uhlig, Volkmar, et al., Towards Scalable Multiprocessor Virtual Machines—Published Date: May 6-7, 2004, 14 pages, System Architecture Group. I4ka.org/publications/2004/Towards-Scabable-Multiprocessor-Virtual-Machines-VM04.pdf.

Fahrig, Thomas, Hypervisor Scheduler Overview—Published Date: Apr. 10, 2008, 20 pages, dcl.hpi.uni-potsdam.de/scsummit/slides/tom.fahrig.pdf.

Friebel, Thomas, et al., How to Deal with Lock Holder Preemption—Retrieved Date: Sep. 1, 2009, 5 pages. amd64.org/fileadmin/user_upload/pub/2008-Friebel-LHP-GI_OS.pdf.

Southern, Gabriel, Analysis of SMP VM CPU Scheduling—Retrieved Date: Sep. 1, 2009, George Mason University, 8 pages. cs.gmu.edu/~hfoxwell/cs671projects/southern_v12n.pdf.

* cited by examiner

*Primary Examiner* — Mengyao Zhe
(74) *Attorney, Agent, or Firm* — Ben Tabor; Kate Drakos; Mickey Minhas (57) ABSTRACT

Computerized methods, computer systems, and computer-readable media for governing how virtual processors are scheduled to particular logical processors are provided. A scheduler is employed to balance a load imposed by virtual machines, each having a plurality of virtual processors, across various logical processors (comprising a physical machine) that are running threads in parallel. The threads are issued by the virtual processors and often cause spin waits that inefficiently consume capacity of the logical processors that are executing the threads. Upon detecting a spin-wait state of the logical processor(s), the scheduler will opportunistically grant time-slice extensions to virtual processors that are running a critical section of code, thus, mitigating performance loss on the front end. Also, the scheduler will mitigate performance loss on the back end by opportunistically de-scheduling then rescheduling a virtual machine in a spin-wait state to render the logical processor(s) available for other work in the interim.

12 Claims, 9 Drawing Sheets

OPPORTUNISTICALLY SCHEDULING AND ADJUSTING TIME SLICES

BACKGROUND

Large-scale networked systems are commonplace platforms employed in a variety of settings for running applications and maintaining data for business and operational functions. For instance, a data center (e.g., physical cloud computing infrastructure) may provide a variety of services (e.g., web applications, email services, search engine services, etc.) for a plurality of customers simultaneously. These large-scale networked systems typically include a large number of resources distributed throughout the data center, in which each resource resembles physical machines or virtual machines running as guests on a physical host.

When the data center hosts multiple guests (e.g., virtual machines), these resources are scheduled to logical processors within the physical machines of a data center for varying durations of time. Often, mechanisms are utilized by operating system kernels to carry out the scheduling, as well as to synchronize data structures (e.g., logical processors) within the physical machines. These mechanisms typically employ the technique of spin waiting, which allows a logical processor that is scheduled to a virtual machine to spend time waiting for an event to occur without being rescheduled to another virtual machine. Generally, spin waits are consistently used in multithreaded environments that consider the costs associated with rescheduling a virtual machine much greater than the inefficiencies of interrupting a spin wait.

The multithreaded environments also rely on these mechanisms to schedule threads issued by multiple virtual processors (comprising the virtual machines) to be executed on multiple logical processors simultaneously. However, spin waits that are presently occurring on one or more of the multiple logical processors block the threads from being scheduled by others of the multiple virtual processors. These blocked logical processors create inefficiencies within the multithreaded environment. Accordingly, the general policy of allowing spin waits to achieve completion results in under-utilization of physical machines within a data center and significant throughput reductions with respect to the logical machines.

SUMMARY

This Summary is provided to introduce concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention provide mechanisms that operate within a multithreaded environment and that opportunistically allow a spin wait to occur on a logical processor for a predefined period of time, or to de-schedule a virtual processor from the logical processor performing the spin wait for a predefined period of time before rescheduling the virtual processor to finish a particular task. In one embodiment, these mechanisms, such as the scheduler, are configured to receive indications that depict a state of a spin wait that is in progress and to act based on the spin-wait state. For instance, if the spin wait occurs while the logical processor is executing a critical section of code, a time-slice extension that has a reduced duration of time may be granted to the virtual processor scheduled to the logical processor. Accordingly, completion of the ongoing spin wait is accelerated while a load imposed by a plurality of virtual processors is balanced across resources of a physical machine.

In another embodiment, the scheduler is configured to reduce the occurrence of long spin waits by de-scheduling a virtual processor, which is presently performing a spin wait, that has acquired a lock on a logical processor. However, upon waiting a predetermined time frame after de-scheduling the virtual processor, the virtual processor may be rescheduled to the logical processor to resolve the spin wait and, potentially, to successfully acquire the lock on the logical processor. Accordingly, the procedure of de-scheduling the virtual processor allows another virtual processor to perform work on the now available logical processor. Further, the procedure of rescheduling after the predetermined time frame facilitates achieving timely execution of a thread, issued by the virtual processor, at the logical processor. By completing execution of the thread in this way, other logical processors, which have been allocated to the same virtual processor, may commence or continue executing their respective threads with minimal delay.

In yet another embodiment, the scheduler is configured to reduce the inefficiencies associated with scheduling a virtual processor to a remote logical processor, which is removed from memory utilized by the virtual processor. Generally, in the context of a non-uniform memory access (NUMA) topology, executing a thread issued by the virtual processor at a remote logical processor is inefficient because, during execution, the remote logical processor frequently accesses local memory of the virtual processor that resides in a removed location. However, the scheduler can be enlightened to recognize that the remote logical processor was scheduled and can be designed to allocate a reduced time slice on the remote logical processor. In an exemplary embodiment, the reduced time slice has a duration of time associated therewith that is less than a duration of time associated with a pre-established time slice that is generally allocated on a local logical processor.

BRIEF DESCRIPTION OF THE DRAWINGS

Embodiments of the present invention are described in detail below with reference to the attached drawing figures, wherein.

DETAILED DESCRIPTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to methods, computer systems, and computer-readable media for dynamically scheduling virtual processors to logical processors, based on a present state of the logical processors, in order to implement front-end and back-end mitigation of inefficiencies caused by spin waits. In one aspect, embodiments of the present invention relate to one or more computer-readable media having computer-executable instructions embodied thereon that, when executed, perform a front-end method for prolonging allocation of a logical processor to a first virtual processor. Initially, the method includes the step of detecting an expiration of an initial time slice awarded to the first virtual processor that has acquired a lock on the logical processor. Typically, the initial time slice expires after the logical processor executes a thread, issued from the first virtual processor, for a predetermined duration of time.

A determination of whether the first virtual processor is executing a critical section of code associated with the thread is performed. When the determination indicates that the first virtual processor is executing the critical section of code, the method may involve granting the first virtual processor a first time-slice extension. Generally, the first time-slice extension allocates the logical processor for executing the thread for a reduced duration of time. In an exemplary embodiment, the first time-slice extension is shorter in duration than the initial time slice. The method may further include periodically inspecting the logical processor to ascertain whether the critical section of code is still being executed, and, if so, granting additional time-slice extensions.

In another aspect, embodiments of the present invention relate to a computer system for reducing runtime of a thread being executed at a node that is remotely located from memory utilized by a virtual processor. Initially, the computer system includes a first node residing on a physical machine, a second node residing on the physical machine, and a scheduler running on the physical machine. In one instance, the second node is remotely located from the memory associated with the first node. In operation, the scheduler is configured to receive an indication that the virtual processor is attempting to execute a thread and to ascertain that one or more logical processors in the first node are blocking the thread. Typically, the memory that is local to the virtual processor is included in the first node. In an exemplary embodiment, the scheduler is configured to schedule a reduced time slice on a logical processor in the second node selected to execute the thread. In this embodiment, a duration of time associated with the reduced time slice is less than a duration of time associated with a pre-established time slice generally allocated on the logical processors in the first node.

In yet another aspect, embodiments of the present invention relate to a computerized method for de-scheduling a first virtual processor from a logical processor upon acquiring a lock thereto. In one embodiment, the method involves identifying that the first virtual processor has acquired a lock on the logical processor. Typically, the virtual processor is configured to execute a thread issued by the first virtual processor upon acquiring the lock. The method may further involve inspecting the logical processor to determine a duration of a spin wait. As discussed herein, the phrase "spin wait" generally pertains to the performance of nonproductive loops while attempting to execute the thread at the logical processor. The spin-wait duration may be compared against a time threshold, where the time threshold represents a predefined number of the nonproductive loops performed consecutively by the logical processor. When the spin-wait duration exceeds the time threshold, a scheduler may be employed to de-schedule the first virtual processor from the logical processor for a predetermined time frame. Also, the scheduler may schedule a second virtual processor to the logical processor for an interim time slice.

Having briefly described an overview of embodiments of the present invention, an exemplary operating environment suitable for implementing embodiments of the present invention is described below.

Figure 1:
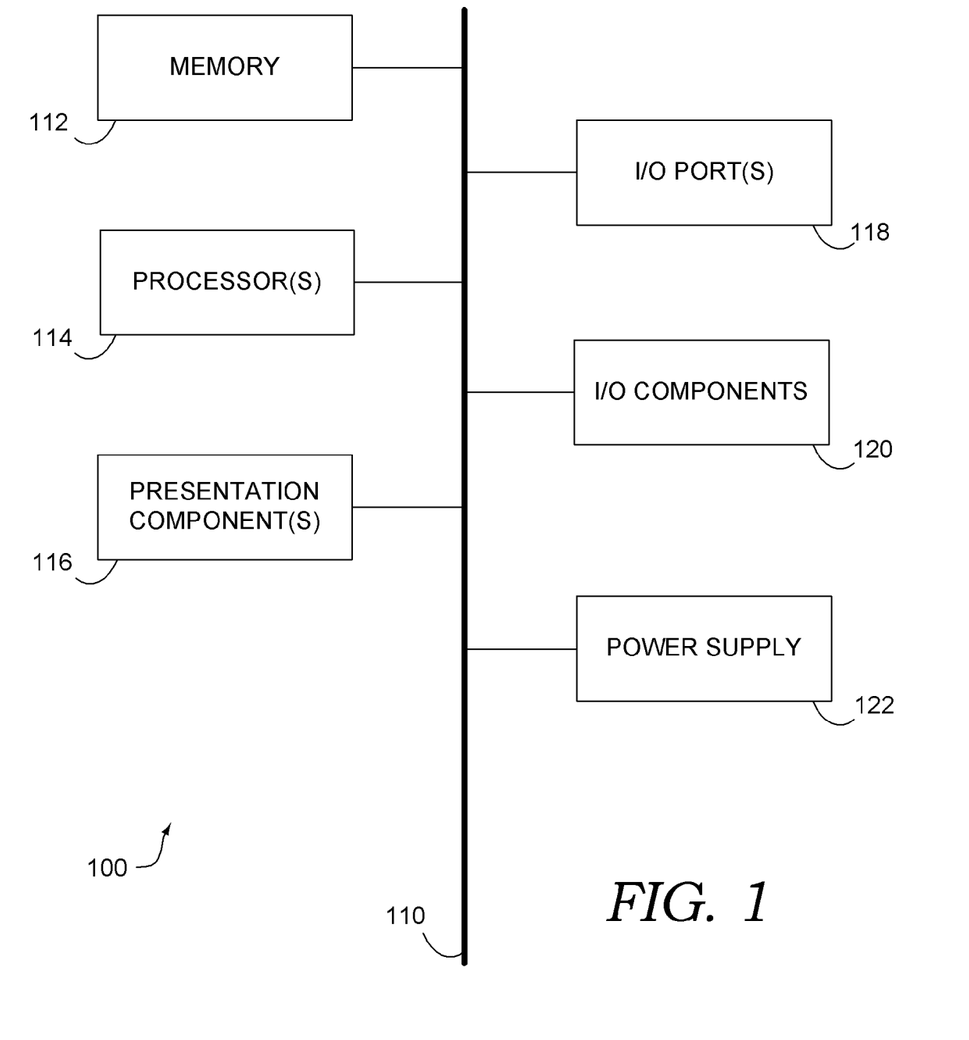
FIG. 1 is a block diagram of an exemplary computing environment suitable for use in implementing embodiments of the present invention.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of embodiments of the present invention. Neither should the computing environment 100 be interpreted as having any dependency or requirement relating to any one or combination of components illustrated.

Embodiments of the present invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like refer to code that performs particular tasks, or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices, or any other medium that can be used to encode desired information and be accessed by computing device 100.

Memory 112 includes computer storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built-in. Illustrative components include a microphone, joystick, game pad, satellite dish, scanner, printer, wireless device, etc.

Figure 2:
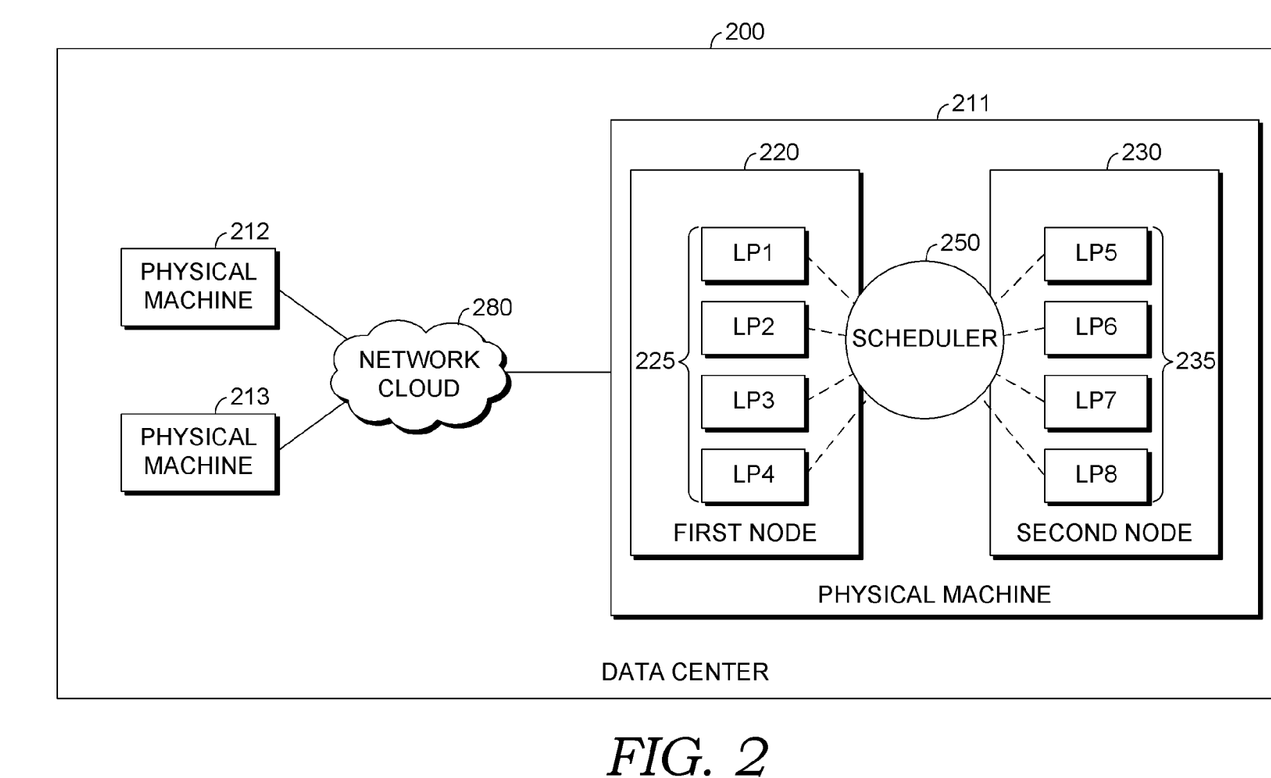
FIG. 2 is a block diagram illustrating an exemplary cloud computing platform, suitable for use in implementing embodiments of the present invention, that is configured to allocate virtual machines within a data center.

Turning now to FIG. 2, a block diagram is illustrated, in accordance with an embodiment of the present invention, showing an exemplary cloud computing platform that is configured to allocate physical machines 211, 212, and 213 within a data center 200 for use by one or more virtual machines. It will be understood and appreciated that the cloud computing platform shown in FIG. 2 is merely an example of one suitable computing system environment and is not intended to suggest any limitation as to the scope of use or functionality of embodiments of the present invention. Neither should the cloud computing platform 200 be interpreted as having any dependency or requirement related to any single component or combination of components illustrated therein. Further, although the various blocks of FIG. 2 are shown with lines for the sake of clarity, in reality, delineating various components is not so clear, and metaphorically, the lines would more accurately be grey and fuzzy.

The cloud computing platform includes the data center 200 that is comprised of interconnected physical machines 211, 212, and 213, which are configured to host and support operation of virtual machines. In particular, the physical machines 211, 212, and 213 may include one or more nodes that have logical processors for running operations, tasks, or threads issued by the logical machines. These nodes may be partitioned within hardware of the physical machines 211, 212, and 213 in order to isolate applications or program components running thereon. However, the nodes may be connected across the hardware of a physical machine via hubs (not shown) that allow for a task, command, or thread (i.e., issued by an application or program component) being executed on a remote node to access memory at another node that is local to the application or the program component. The phrase "application," as used herein, broadly refers to any software, service application, or portions of software, that runs on top of, or accesses storage locations within, the data center 200.

By way of example, the physical machine 211 could possibly be equipped with two individual nodes, a first node 220 and a second node 230. However, it should be understood that other configurations of the physical machine 211 are contemplated (i.e., equipped with any number of nodes). The first node 220 and the second node 230 each include separate resources in the physical machine 211, but can communicate via a hub (not shown) to access remote memory. Often this type of a communication involves consuming significant resources and, thus, is more expensive than running the processes in isolation on the respective first node 220 and second node 230. Further, the first node 220 and the second node 230 may be provisioned with physical processors. For instance, the first node 220 may be provisioned with a set of physical processors 225 that includes logical processors LP1, LP2, LP3, and LP4. Similarly, the second node 230 may include a set of physical processors 235 that includes logical processors LP5, LP6, LP7, and LP8. In this embodiment, both the nodes 225 and 235 resemble multicore, or QuadCore, processors that are constructed with multiple physical cores (e.g., LP1-LP8) for processing threads in parallel. Although specific configurations of nodes are depicted, it should be appreciated and understood that threads, tasks, and commands from the virtual machines may be executed by various processing devices which are different in configuration from the specific illustrated embodiments above. For instance, any number of logical processors, working in conjunction with other resources (e.g., software and/or hardware), can be used to carry out operations assigned to the nodes 225 and 235. Therefore it is emphasized that embodiments of the present invention are not limited only to the configurations shown and described, but embrace a wide variety of computing device designs that fall within the spirit of the claims.

Typically, the logical processors LP1-LP8 represent some form of a computing unit (e.g., central processing unit, microprocessor, blades of a server, etc.) to support operations of the virtual machines running thereon. As utilized herein, the phrase "computing unit" generally refers to a dedicated computing device with processing power and storage memory, which supports one or more operating systems or other underlying software. In one instance, the computing unit is configured with tangible hardware elements, or machines, that are integral, or operably coupled, to the nodes 220 and 230, or the physical machines 211, 212, and 213, within the data center 200 to enable each device to perform a variety of processes and operations. In another instance, the computing unit may encompass a processor coupled to a computer-readable medium accommodated by the nodes 220 and 230. Generally, the computer-readable medium stores, at least temporarily, a plurality of computer software components that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions.

Per embodiments of the present invention, the physical machines 211, 212, and 213 represent any form of computing devices, such as a personal computer, a desktop computer, a laptop computer, a mobile device, a consumer electronic device, server(s), blades in a stack, the computing device 100 of FIG. 1, and the like. In one instance, the physical machines 211, 212, and 213 host and support the operations of the virtual machines assigned thereto, while simultaneously hosting other virtual machines, or guests, created for supporting other customers of the data center 200. In operation, these guests support service applications owned by those customers.

In one aspect, the nodes 220 and 230 operate within the context of the cloud computing platform and, accordingly, communicate internally through connections dynamically made between the physical machines 211, 212, and 213, and externally through a physical network topology to other resources, such as a remote network (e.g., enterprise private network). The connections may involve interconnecting via a network cloud 280. The network cloud 280 interconnects these resources such that the node 220 may recognize a location of the node 230, and other nodes, in order to establish communication pathways therebetween. In addition, the network cloud 280 may establish this communication over channels connecting the nodes 220 and 230. By way of example, the channels may include, without limitation, one or more local area networks (LANs) and/or wide area networks (WANs). Such networking environments are commonplace in offices, enterprise-wide computer networks, intranets, and the Internet. Accordingly, the network is not further described herein.

Figure 3:
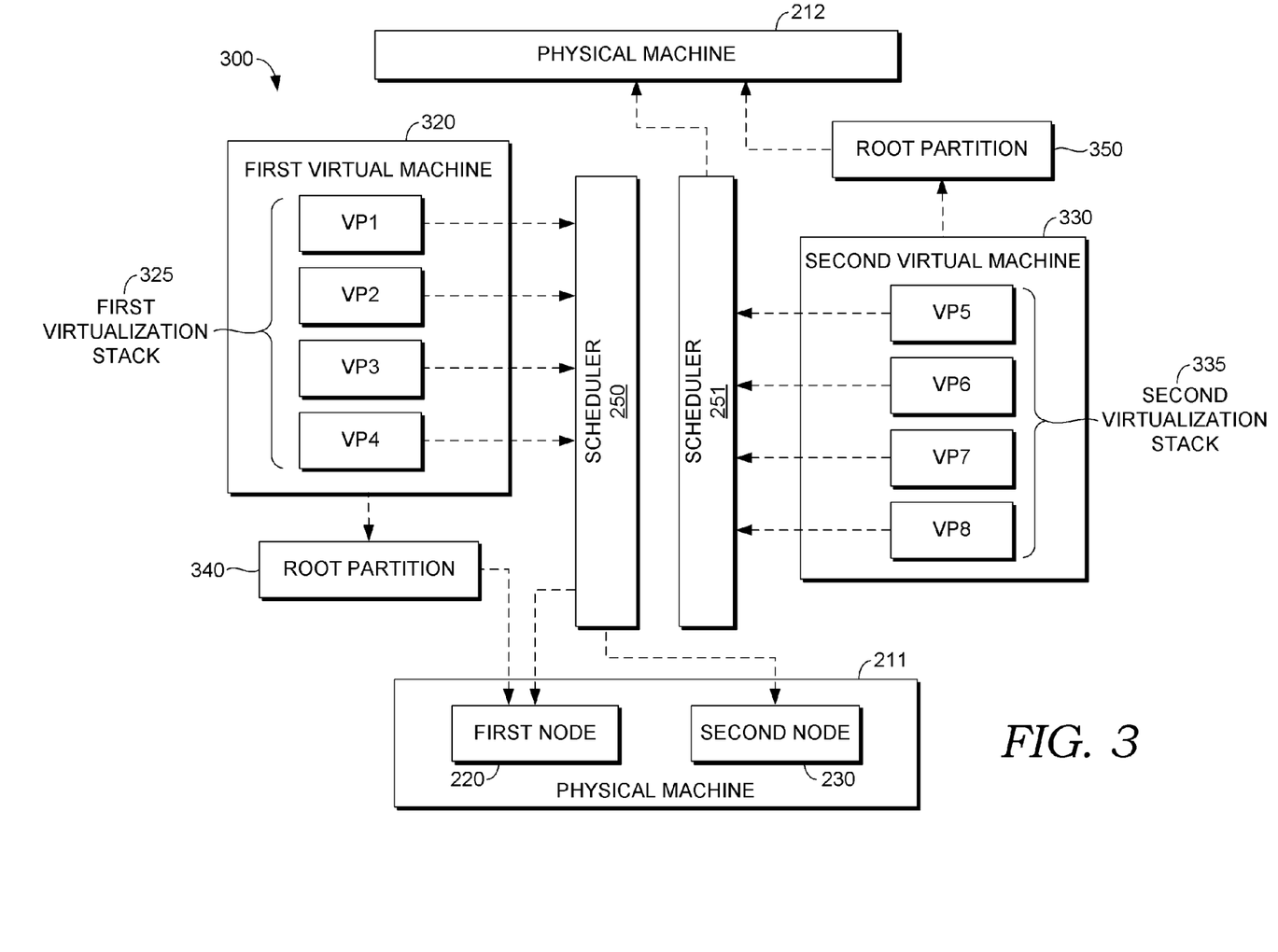
FIG. 3 is block diagram of an exemplary distributed multithread environment illustrating virtual machines overlaid on physical machines via a scheduler, in accordance with an embodiment of the present invention.

Turning now to FIG. 3, a block diagram is illustrated that shows an exemplary distributed multithread environment 300 depicting virtual machines 320 and 330 overlaid on physical machines, such as the physical machine 211, via schedulers 250 and 251, in accordance with an embodiment of the present invention. In one embodiment, the virtual machines 320 and 330 may represent the portions of software and hardware that participate in running a service application. The virtual machines 320 and 330 are typically maintained by a virtualization layer, such as the respective schedulers 250 and 251, that virtualizes hardware, such as the first node 220 and second node 230, for executing commands, tasks, and threads. In one example, the first virtual machine 320 includes a first virtualization stack 325 of virtual processors (VP1, VP2, VP3, and VP4) that is associated with the scheduler 250. In this example, the second virtual machine 330 includes a second virtualization stack 335 of virtual processors (VP5, VP6, VP7, and VP8) that is associated with the scheduler 251. In this example, the scheduler 250 is configured to schedule threads (illustrated as dashed lines), issued by the virtual processors VP1-VP4, to the logical processors provisioned within the first node 220 and the second node 230, respectively. The scheduler 251 is configured to schedule threads (illustrated as dashed lines), issued by the virtual processors VP5-VP8, to the logical processors provisioned within another instance of the physical machine 212, as discussed above with reference to FIG. 2.

By way of example, the scheduler 250 allocates time slices on the logical processors to execute threads, such that the logical processors can support a multitude of threads issued from the virtual processors VP1-VP4 plus other virtual processors (not shown) in tandem. In an exemplary embodiment, the scheduler 250 allocates time slices for VP1-VPX, where X is greater than four (i.e., hosting many virtual processors on fewer logical processors). In this situation, the number of virtual processors outnumber a number of logical processors so there is not a one-to-one correlation therebetween, thus, the scheduler 250 is configured to dynamically manage usage of logical processors to balance a changing load imposed by many virtual processors. As used herein, the phrase "time slice" is not meant to be limiting, but may encompass a share of computing resources (e.g., CPU and/or memory) that is granted to a virtual processor to execute a thread, or some other work issued by the virtual processor.

Generally, the virtual processors VP1-VPX of the virtual machine 320 are allocated on one or more logical processors to support functionality of a service application, where allocation is based on demands (e.g., amount of processing load) applied by the service application. As used herein, the phrase "virtual machine" is not meant to be limiting and may refer to any software, application, operating system, or program that is executed by a logical processor to enable the functionality of a service application running in a data center. Further, the virtual machines 320 and 330 may access processing capacity, storage locations, and other assets within the data center to properly support the service application.

In operation, the virtual processors VP1-VPX comprising the virtual machine 320 are dynamically scheduled to resources (e.g., logical processors LP1-LP4 of FIG. 2) within a physical computer system inside the data center. In a particular instance, threads issued from the virtual processors are dynamically awarded time slices on logical processors to satisfy a current processing load. In embodiments, a scheduler 250 is responsible for automatically allocating time slices on the logical processors. By way of example, the scheduler 250 may rely on a service model (e.g., designed by a customer that owns the service application) to provide guidance on how and when to allocate time slices on the logical processors.

As used herein, the term "scheduler" is not meant to be limiting, but may refer to any logic, heuristics, or rules that are responsible for scheduling the virtual processors VP1-VPX, or any other virtual processors, on available logical processors. In an exemplary embodiment, the scheduler 250 attempts to select the optimal, or best suited, logical processor to accept and execute a particular virtual processor. Upon selection, the scheduler 250 may proceed to allocate a time slice on the optimal logical processor and to place the thread thereon. These decisions (e.g., selection, allocation, and scheduling) performed by the scheduler 250 are imperative to the proper and timely performance of a service application. Further, it is advantageous to use efficient algorithms when making the decisions.

In embodiments, the schedulers 250 and/or 251 represent local schedulers that are running on each instance of a physical machine individually. As illustrated, the scheduler 250 is running on the physical machine 211, while the scheduler 212 is running on the physical machine 212. Accordingly, the schedulers 250 and 251 illustrated in FIG. 3 manage workload within a particular physical machine, where such physical machines include a scheduler (hypervisor), a single root partition, and one virtualization stack. The physical machines 211 and 212 make up a portion of the data center which is configured to host the virtual machines.

As more fully discussed below, the embodiments of the present invention relate to opportunistically scheduling threads, thereby reducing spin waits. By way of example, the scheduler 250 may include a hypervisor. In operation, the hypervisor manages CPUs and memory in the physical machine 211 and is responsible for multiplexing the logical processors onto many virtual processors. The hypervisor manages virtual processors belonging to virtual machines hosted within the data center and provide optimal performance characteristics for guests (e.g., virtual machines 320 and 330) that run on top of the logical processors.

In a particular instance, the hypervisor is charged with scheduling logical processors in a way that maintains a parity (of access to the logical processors) among the virtual processors VP1-VPX, thus promoting fairness within the system. This type of a scheduling may involve implementing a selection scheme that attempts to evenly distribute the allocated time slices of the logical processors between the virtual processors VP1-VPX, while still opportunistically granting extended time slices to particular virtual processors when certain conditions are detected (e.g., executing a critical section of code). Thus, via the methods discussed below, the hypervisor can mitigate front-end inefficiencies caused by unenlightened de-scheduling of the virtual machines and can mitigate back-end inefficiencies by preemptively de-scheduling those virtual machines having issued threads presently in a spin-wait state. In other embodiments, the hypervisor looks at a priority of a virtual processor, an amount of time awarded the virtual processor with respect to time awarded to other virtual processors, and/or other criteria when deciding how to schedule the logical processors to the virtual processors VP1-VPX.

It will be understood and appreciated that the hypervisor included within the scheduler 250 shown in FIG. 3 is merely an example of suitable logic to support the service application and is not intended to suggest any limitation as to the scope of use or functionality of embodiments of the present invention.

Each of the virtual machines 320 and 330 may be associated with one or more virtual processors configured as root partitions. Typically, one virtual machine is associated with a single root partition, as illustrated in FIG. 3. As further illustrated in FIG. 3, the first virtual machine 320 is associated with a root partition 340 while the second virtual machine 330 is associated with a root partition 350. As described herein, the root partitions 340 and 350 generally pertain to mechanisms that support the input/output activity of the other virtual processors VP1-VPX of the virtual machines 320 and 330. In this role, the root partitions 340 and 350 allow for communication between the virtual machines 320 and 330 and may be responsible for networking with many other virtual machines (e.g., via a direct access to the network) by leveraging a network card, disk, or other hardware. In one instance of operation, the root partitions 340 and 350 are configured to generate a request at local virtual machines 320 and 330, respectively, via a dedicated channel in the hardware, and to convey the request to remote virtual machines, thereby enforcing security and isolation of the virtual machines.

In an exemplary embodiment, the first node 220 and the second node 230 form a computer system that, when managed by the scheduler 250, is capable of reducing runtime of a thread being executed at one node (e.g., second node 230) that is remotely located from memory on another node (e.g., first node 220) being utilized by a virtual processor. Generally, if a virtual processor within either virtualization stack 325 or 335 occupies memory (not shown) in the first node 220, this memory is local to the logical processor of the first node 220. The presence of local memory enables efficient execution of a thread issued from the virtual processor when the thread is scheduled to the logical processors of the first node 220. In contrast, when the thread issued by the virtual processor is scheduled to a remote logical processor on the second node 230, any access to the memory on the first node 220 is inefficient because communication is conducted via a hub, which connects the first node 220 and the second node 230 across a hardware partition. This is true even in the situation where the first node 220 and the second node 230 are carved out of resources of the same physical machine 211.

Accordingly, embodiments of the present invention address this inefficiency by configuring the scheduler 250 to allocate longer time slices on local logical processors residing on the first node 220, where the virtual processor is associated with memory in the first node 220, and to allocate shorter time slices on remote logical processors residing on the second node 230. In particular implementations of this allocation scheme, the scheduler 250 is initially configured to receive an indication that a virtual processor is attempting to execute a thread. The indication may be based on the operating system detecting one of the root partitions 340 or 350 is attempting to perform input/output work on behalf of other virtual machines, thus acting in a hosting capacity. Also, this indication may be provided by the operating system installed on the physical machine 211.

Upon receiving the indication, the scheduler 250 may initially ascertain whether one or more local logical processors in the first node 220 are available, where memory that is local to the virtual processor is included in the first node 220. If it is determined that the first node 220 lacks the available resources to execute the thread, the scheduler 250 may inspect the second node 320 to ascertain its present availability. If there exists a remote logical processor in the second node 230 that can execute the thread, that remote logical processor is scheduled to execute the thread. As such, even though this remote logical processor will likely not execute the thread as efficiently as the local logical processor, the scheduler prioritizes fulfilling requests from the virtual processors in a timely manner over waiting for the most-efficient resources to become available.

However, because the remote logical processor is not as efficient as the local logical processor, the scheduler 250 may allocate a reduced time slice on the remote logical processor in the second node 230. In an exemplary embodiment, the duration of time associated with the reduced time slice is less than a duration of time associated with a pre-established time slice generally allocated on the local logical processors in the first node 220. By way of example, the reduced time slice may be associated with a duration of time lasting 100 microseconds (μs), while the pre-established time slice may be associated with a duration of time lasting 10 milliseconds (ms). In this way, the scheduler can make opportunistic time slice adjustments for threads running on remote logical processors in nonideal nodes, such as the second node 230 in this example. This technique employed by the scheduler 250 for decreasing time slices on nonideal nodes, in comparison to time slices allocated on preferred nodes, can be applied to a nonuniform memory access (NUMA) topology to improve overall system performance.

By decreasing time slices on nonideal nodes, the scheduler 250 reduces runtime of a thread being executed on the remote logical processors. But, because root partitions 340 and 350 often exhibit bursty behavior, where a compact set of tasks are requested in a sporadic fashion, the reduced runtime is still generally adequate to satisfy the needs of the root partitions 340 and 350. If the runtime is not adequate (i.e., the reduced time slice scheduled on the remote logical processor in the nonideal node elapsed), the scheduler 250 can return to the preferred node (first node 220) to check for local-logical-processor availability. Accordingly, this sampling approach provides the scheduler 250 with opportunities to optimize the scheduling of the pending threads, such that threads are attended to in a reasonable time frame while inefficient scheduling is limited.

Figure 4:
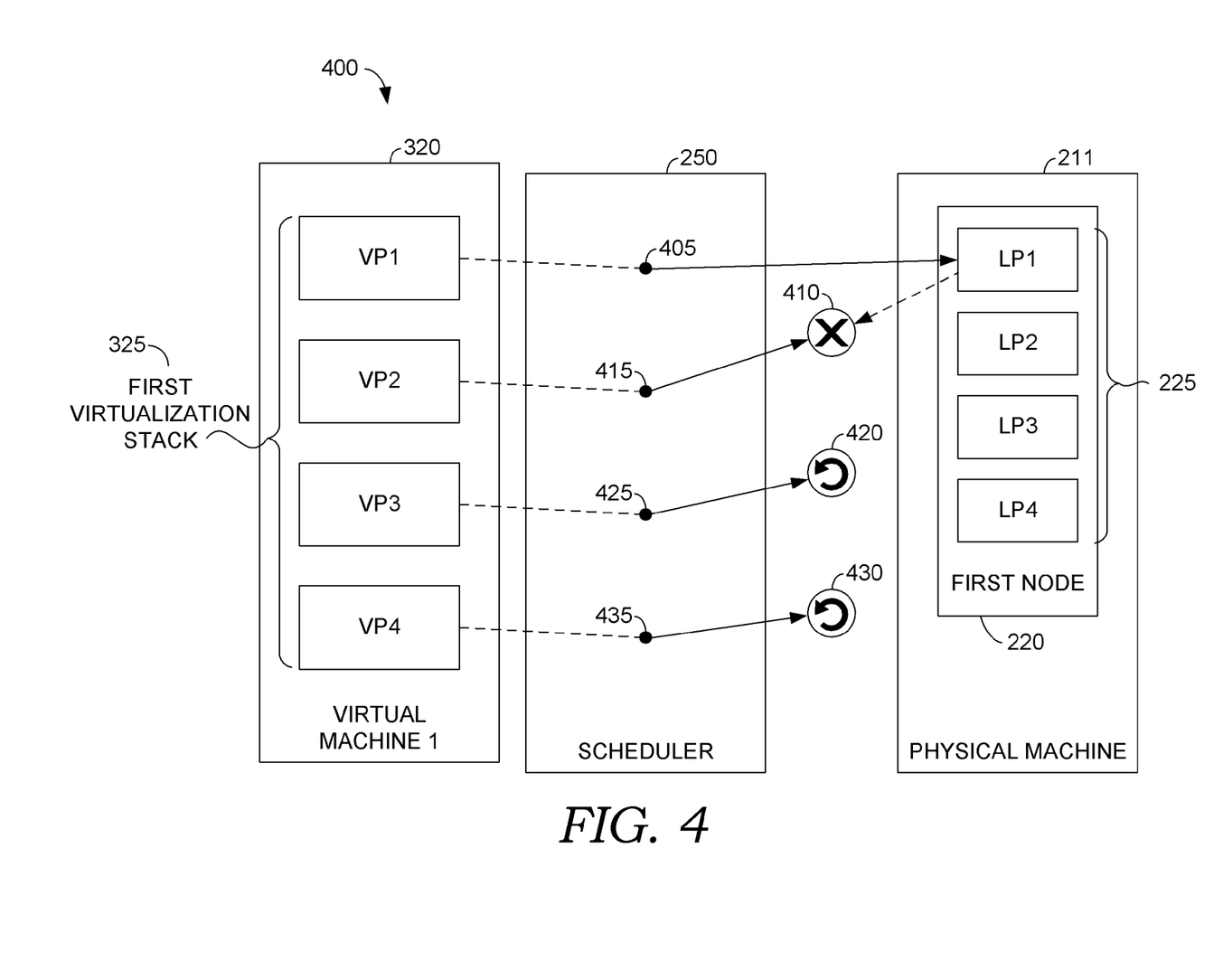
FIG. 4 is a block diagram of an exemplary distributed multithread environment where virtual processors are interacting with a physical machine via the scheduler, in accordance with an embodiment of the present invention.

Turning now to FIG. 4, a block diagram is shown that illustrates an exemplary distributed multithread environment 400 where the first virtualization stack 325 of virtual processors VP1-VP4 are interacting with logical processors 225 of the physical machine 211 via the scheduler 250, in accordance with an embodiment of the present invention. It should be appreciated and understood that this interaction illustrated in FIG. 4 is exemplary and intended to explain one embodiment of operation of the scheduler 250.

Initially, a thread 405 from virtual processor VP1 is identified by the scheduler 250. Upon identification, the scheduler queries the logical processors 225 to find a logical processor that is available. In this exemplary interaction, logical processor LP1 is found to be available to execute the thread. Accordingly, the scheduler 250 allocates an initial time slice on LP1 such that LP1 can begin execution of the thread 405. As discussed below, the scheduler 250 may opportunistically create availability on LP1 by de-scheduling a thread 415 issued from virtual processor VP2. This creation of availability may be in response to detecting that the thread 415 was performing a spin wait for an extended number of consecutive cycles. As illustrated, reference numeral 410 depicts the de-scheduled thread 415 waiting in queue to be rescheduled at LP1 where the thread 415 had previously acquired a lock. The threads 425 and 435, issued from the virtual processors VP3 and VP4, respectively, are shown as residing in spin-wait states 420 and 430. As discussed above, spin waits consume resources if left to cycle for an extended amount of time. Accordingly, it is advantageous to expend a minimal amount of power to govern scheduling of the threads 405, 415, 425, and 435, as opposed to allowing spin waits to progress unchecked.

Figure 5:
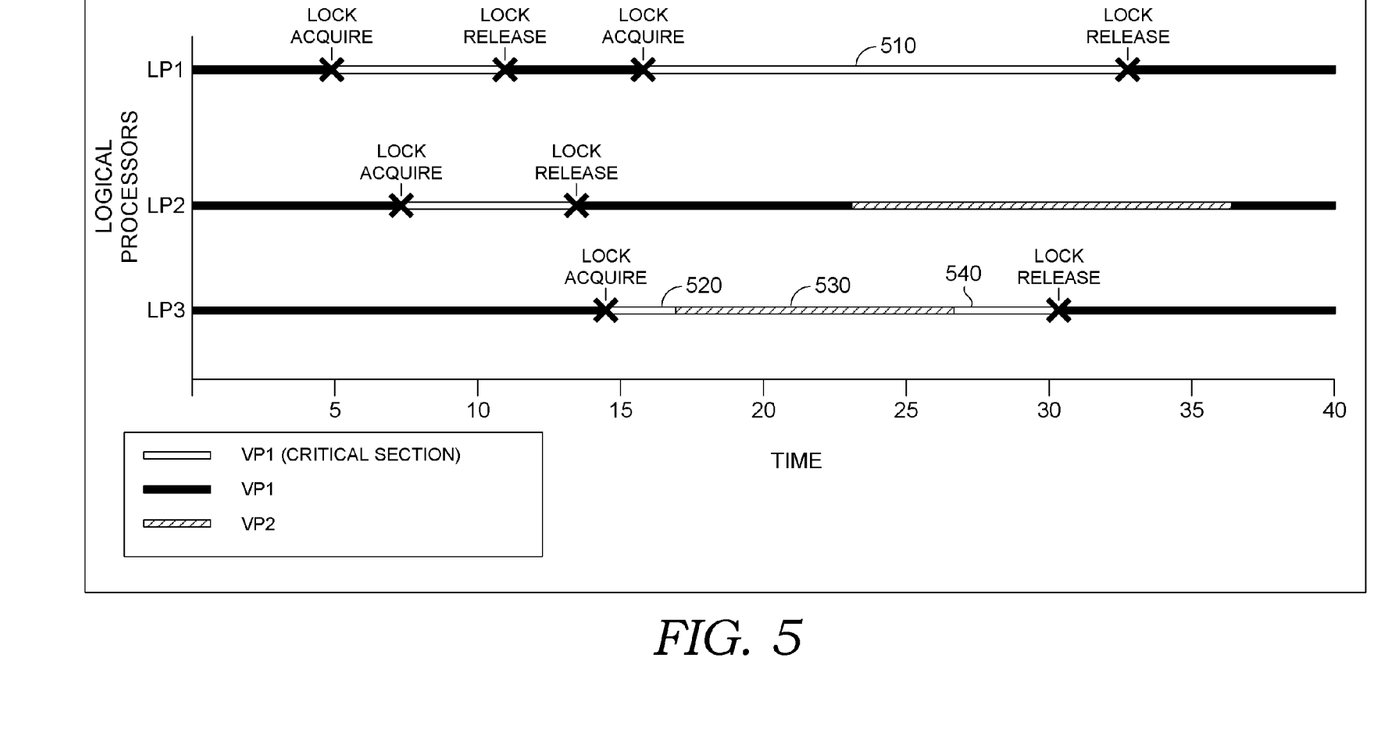
FIGS. 5-7 are schematic depictions of schemes for scheduling virtual processors to physical processors upon the virtual processors acquiring a lock thereto, in accordance with embodiments of the present invention.
Figure 6:
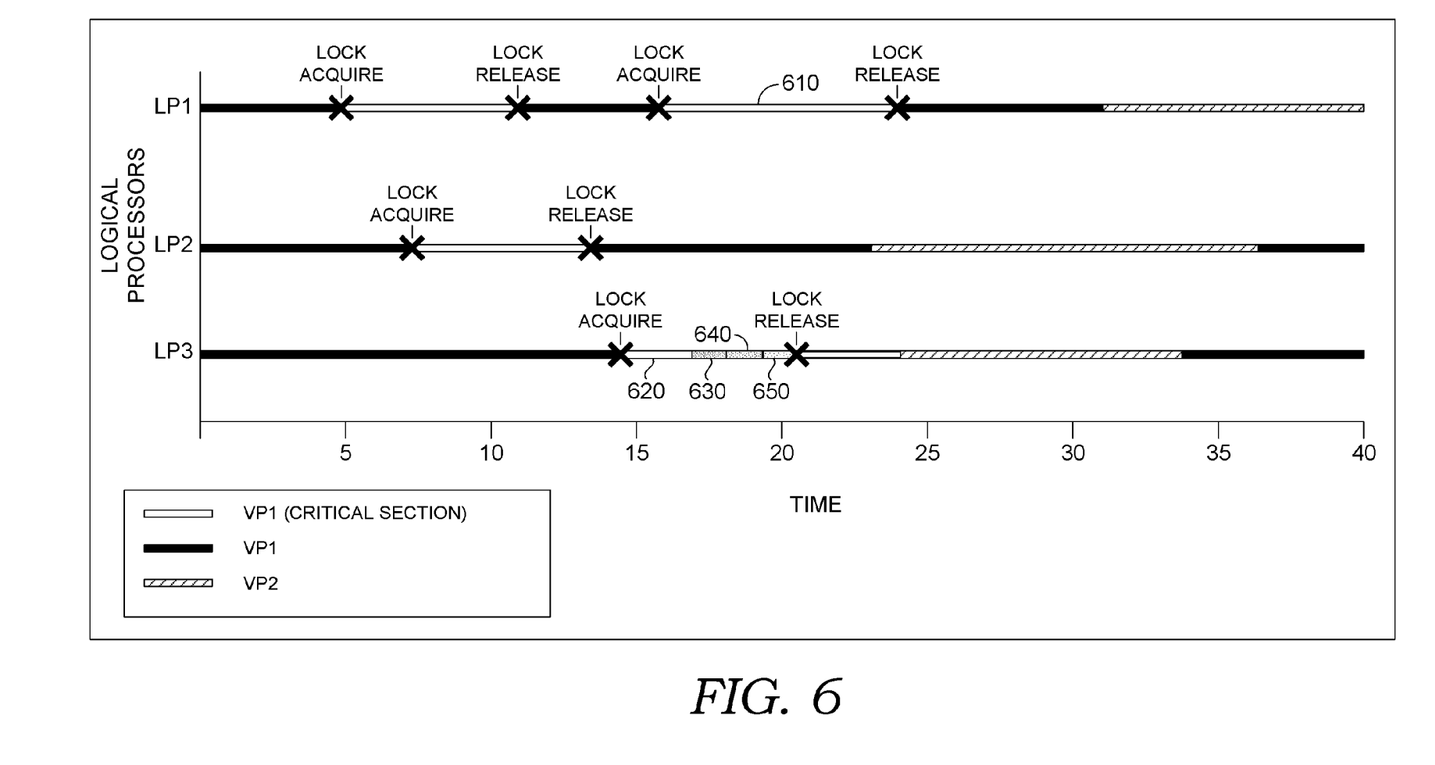
Figure 7:
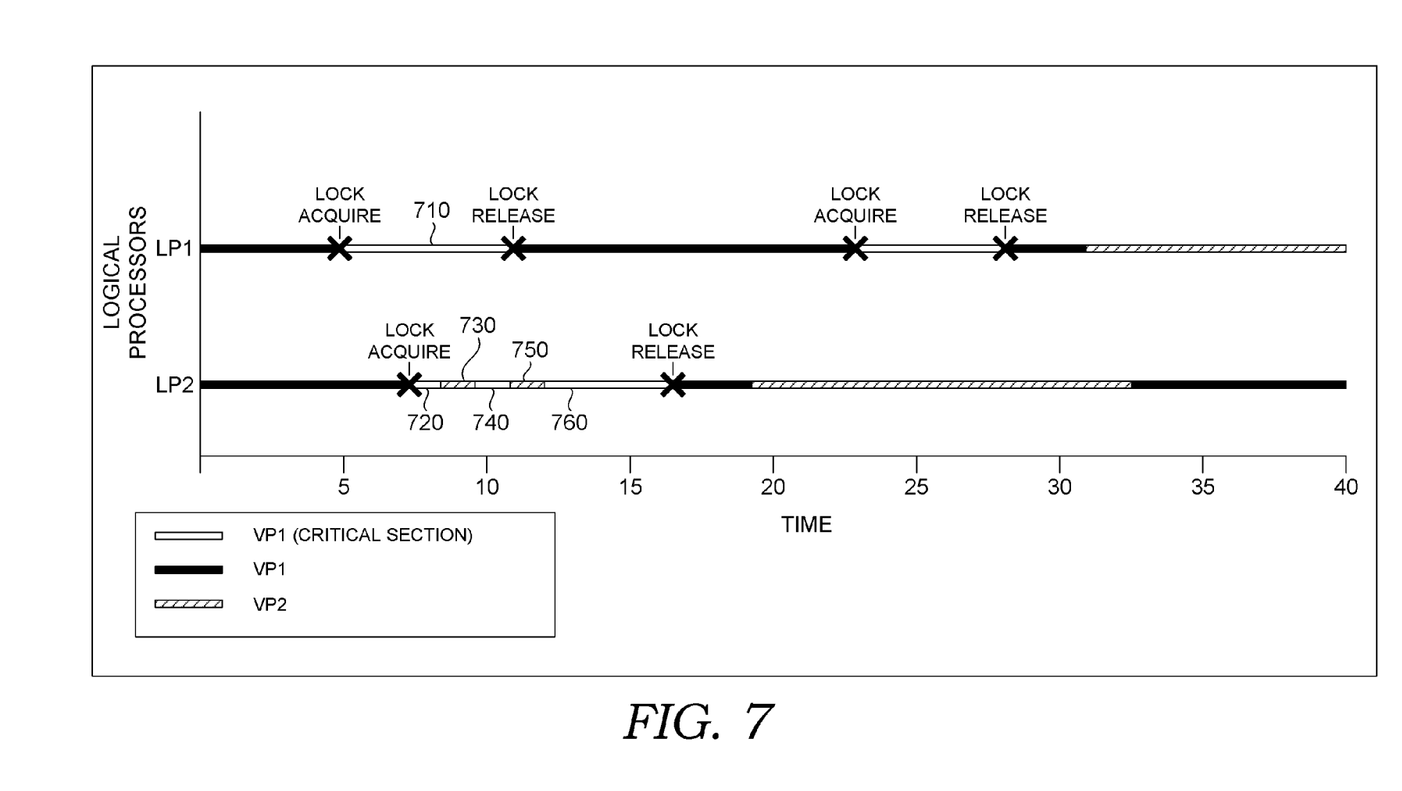

With reference to FIGS. 5-7, schematic depictions of schemes for scheduling virtual processors to physical processors, upon the virtual processors acquiring a lock thereto, are shown in accordance with embodiments of the present invention. Initially, the schemes are formatted as bar charts with up to three physical processors LP1, LP2, and LP3 represented on the y-axis while some period of time is represented on the x-axis. The hash marks on the x-axis are meant to depict a linear procession of time and not to indicate an actual duration of time slices that are allocated on the physical machines.

Referring to the schematic depiction of the scheme in FIG. 5, this scheme demonstrates issues that may occur when a virtual processor VP1 has acquired a lock, or spinlock, on two separate logical processors LP1 and LP3 in tandem. Initially, VP1 acquires a lock on LP3 and is allocated a time slice 520 to execute a critical section of code associated with a thread. Before completing execution, VP1 acquires a lock on LP1 and is allocated a time slice 510 to execute another critical section of code associated with a thread. Successfully executing this other critical section of code depends on the completed execution of the critical section assigned to LP3. However, before LP3 can complete execution of the critical section assigned thereto, VP1 is de-scheduled from LP3 and VP2 is scheduled at time slice 530. As such, the execution of the critical section on LP1 enters a spin wait until VP1 is rescheduled on LP3, at 540, and completes execution of the critical section. Upon LP3 executing the critical section of code assigned thereto, VP1 releases the lock on LP3 and LP1 is able to complete execution of the critical code in time slice 510.

A shown, the inopportune de-scheduling of VP1, while executing the critical section of code on LP3, causes the inefficient allocation of multiple resources, LP1 and LP3, to VP1 for an extended duration of time. As more fully discussed with reference to FIG. 6, if VP1 had a chance to finish the critical section on LP3, instead of being de-scheduled, VP1 would have released the lock on LP1 earlier. As a result, LP1 would have had greater availability (e.g., not as many virtual processors attempting to access LP1 during the time slice 510 would have been blocked). In practice, the scheme of FIG. 5 is a problem that is inherent to the scheduling of virtual machines and prevents proper scaling of multiprocessor virtual machines if there are no mitigations in place.

Referring to the schematic depiction of the scheme in FIG. 6, this scheme demonstrates a front-end method employed by a scheduler for prolonging scheduling of the logical processor LP1 to the virtual processor VP1. In this case, prolonging scheduling promotes conserving computing resources, such as time consumed on logical processor LP1. As discussed above with reference to FIG. 5, VP1 acquires a lock on LP3. In addition, time slice 620 is initially awarded to VP1 during which LP3 executes a critical section of code associated with a thread issued by VP1. The front-end method asks the scheduler to detect an expiration of the initial time slice 620 awarded to VP1, where the initial time slice 620 typically expires after a predetermined duration of time. The front-end method also allows the scheduler to recognize that the initial time slice 620 expired before LP3 has had the opportunity to fully execute the critical section of a thread, as discussed immediately below.

In embodiments, the scheduler may perform a determination step to ascertain whether LP3 is executing a critical section of code associated with the thread issued from VP1. In one instance, determining whether a virtual processor is executing a critical section of code involves receiving an indication, or hint, from an operating system that the virtual processor is in a critical section of code and that other virtual processors could become blocked if the virtual processor that acquired the lock were to be de-scheduled. The operating system may identify the execution of the critical section by examining a task priority register (TPR) that exposes a level of importance of the threads being executed. In this embodiment, the operating system may determine that any threads with a TPR importance level above a threshold value (e.g., value of 2) are deemed to be in working the critical section. In another embodiment, the operating system may glean that the execution of a critical section of code is occurring by inspecting an interrupt service routine. In yet another embodiment, the operating system may ascertain that a logical processor is executing a critical section of code by identifying the logical processor is running a synchronizing region of code, which determines resources to be accessed by a virtual processor.

When the scheduler determines that the LP3 is executing the critical section of code, the scheduler may grant VP1 a first time-slice extension 630 in order to facilitate LP3 completing the critical section before de-scheduling VP1. In an exemplary embodiment, the first time-slice extension 630 allocates LP3 to VP1 for a reduced duration of time in comparison to the predetermined duration of time associated with the initial time slice 620. By way of example, the initial time slice 620 may have a predetermined duration of 10 ms, while the time-slice extension 630 may have reduced duration of 100 μs. By reducing the duration of the time-slice extension 630, inequities between virtual processors attempting to access a particular logical processor are diminished. However, a length of the reduced duration of time associated with the time-slice extension 630 may be adjusted based upon a priority level attached to the thread, or based on a number of virtual processors within a virtual machine that are supported by a particular logical processor.

In the instance that the scheduler determines that LP3 is not executing a critical section of code for VP1, VP1 may be de-scheduled from LP3 in order to allow other virtual processors to access LP3 and execute threads thereon. By way of example, upon de-scheduling VP1 from LP3, the scheduler may grant virtual processor VP2 time on LP3. In this example, a time slice (not shown) is awarded to VP2 that may be substantially equivalent in duration to the predetermined duration of time associated with the initial time slice 620 awarded to VP1.

Returning to the instance where the scheduler recognized LP3 is running a critical section of code and has granted VP1 the time-slice extension 630, the front-end method may invoke the scheduler to perform a determination of whether LP3 is continuing to execute the critical section of code associated with the thread from VP1. When it is determined LP3 is continuing to execute the critical section of code, the scheduler may grant a second time-slice extension 640 to VP1. As with the time-slice extension 630, the time-slice extension 640 allocates LP3 to VP1 in order to execute the thread for another reduced duration of time. In an exemplary embodiment, the reduced duration of time associated with the first time-slice extension 630 and with the second time-slice extension 640 are substantially equivalent.

Although various configurations of the time slices and time-slice extensions have been described, it should be understood and appreciated that other suitable durations of time slices and time-slice extensions that allocate a logical processor to a virtual processor may be used, and that embodiments of the present invention are not limited to those durations described herein. For instance, the durations of the time-slice extensions 630, 640, and 650 may vary (e.g., grow iteratively shorter in length), or the duration of time slices awarded to VP1 and VP2 may differ.

Upon awarding the second time-slice extension 640 to VP1, the scheduler will again review indications from the operating system to understand whether the critical section of code is still being executed at LP3. If so, the scheduler may again award a time-slice extension, such as the third time-slice extension 650, to VP1. Advantageously, the time-slice extensions 630, 640, and 650 allow LP3 to complete executing the critical section and permit LP1 to proceed with executing a thread for VP1. In this case, LP1 depends on LP3 finalizing execution of the critical section in order for LP1 to fully carry out its execution.

In embodiments, the front-end method continues until either the scheduler receives an indication that LP3 has completed execution of the critical section for LP1, or LP1 releases its lock on LP3. With respect to the latter embodiment, the scheduler may periodically inspect LP3 to determine whether the lock acquired by LP1 is being held. When the lock on LP3 is identified as being released, the front-end method calls for the scheduler to arrest its periodic inspection of LP3 and to refrain from granting VP1 an additional time-slice extension.

In one instance, the scheduler is configured to learn from the logical processors' interactions with the virtual processors. For instance, the scheduler, or another entity residing on the physical machine, may monitor a frequency at which time-slice extensions are granted to LP1, LP2, and any other virtual processor. Based on the monitoring, a pattern may be generated that reflects the frequency of granting the time-slice extensions. In operation, the scheduler may apply this pattern to adjust the reduced duration of time associated with the time-slice extensions or to determine a maximum number of time-slice extensions that may be awarded to a particular virtual processor.

Referring to the schematic depiction of the scheme in FIG. 7, this scheme demonstrates a back-end method employed by a scheduler for de-scheduling the virtual processor VP1 from the logical processor LP2 in order to conserve resources, such as time consumed on logical processor LP2. Initially, VP1 acquires a lock on LP1 and is awarded a time slice 710 to execute a first critical section of code. Then VP1 acquires a lock on LP2 and is awarded a time slice 720 to perform a second critical section of code, where the second critical section depends on LP1 finalizing execution of the first critical section at 710 before it can advance beyond a certain point. Accordingly, VP1 enters a spin wait on LP2 during the time slice 720. As discussed above, spin waits pertain to performing nonproductive loops while attempting to execute the thread at a logical processor and are often inefficient methods for holding a lock on a logical processor.

While VP1 has acquired a lock on both LP1 and LP2, the scheduler may perform the back-end method for de-scheduling VP1 from LP2 after it has acquired a lock and has entered a spin wait. Initially, the back-end method calls for the scheduler to identify that VP1 has acquired a lock on LP2, and that LP2 is executing a thread issued by VP1 upon acquiring the lock. In further accordance with the back-end method, the scheduler may inspect LP2 to determine a duration of a spin wait. This spin-wait duration may be compared against a time threshold. In one instance, the time threshold represents a predefined number of the nonproductive loops (e.g., 4095 cycles) performed consecutively by the logical processor. In another instance, the time threshold is based on a predefined, static period of time. In yet another instance, the time threshold is dynamically tuned based on recorded behavior of the virtual processors, such as the pattern explained above.

When the scheduler determines that the spin-wait duration does not meet the time threshold, it may allow the LP2 to continue attempting to execute the thread issued by VP1 at time slice 720. In contrast, when the scheduler determines that the spin-wait duration on LP2 exceeds the time threshold, VP1 is de-scheduled from LP2 for a predetermined time frame. In this way, the scheduler notices that no useful work is being performed on LP2 at the present time and allows other ready threads to be scheduled on the LP2 to improve overall system throughput.

In addition, the scheduler may schedule another virtual processor VP2 to LP2 for an interim time slice 730 (e.g., 100 microseconds). At some time after awarding the interim time slice 730 to VP2, the scheduler may recognize that the interim time slice 730 has elapsed. Upon elapse, the back-end method instructs the scheduler to reschedule VP1 to LP2 for a time slice 740. At some time after rescheduling VP1 to LP2, the scheduler may detect that the thread being executed at LP2 has entered a subsequent spin wait. The schedule may again ascertain whether a duration of the subsequent spin wait exceeds the threshold time. If so, VP1 is again de-scheduled from LP2. Upon de-scheduling VP1 for a second time, the scheduler may schedule another virtual processor to LP2 for an interim time slice 750. This other virtual processor may be VP2 or a third virtual processor (not shown).

Eventually, LP1 will complete execution of the critical section being run at time slice 710, and VP1 will release the lock on LP1. At this point, the thread running on LP2 will exit a spin-wait state and commence productive execution. This is indicated at time slice 760. Time slice 760 is illustrated as extended because VP1 is not de-scheduled from LP2 when it is not in a spin-wait state. Accordingly, the scheduler allocates LP2 to VP1, when performing productive execution, until the critical section is completely executed and VP1 releases its lock on LP2.

Figure 8:
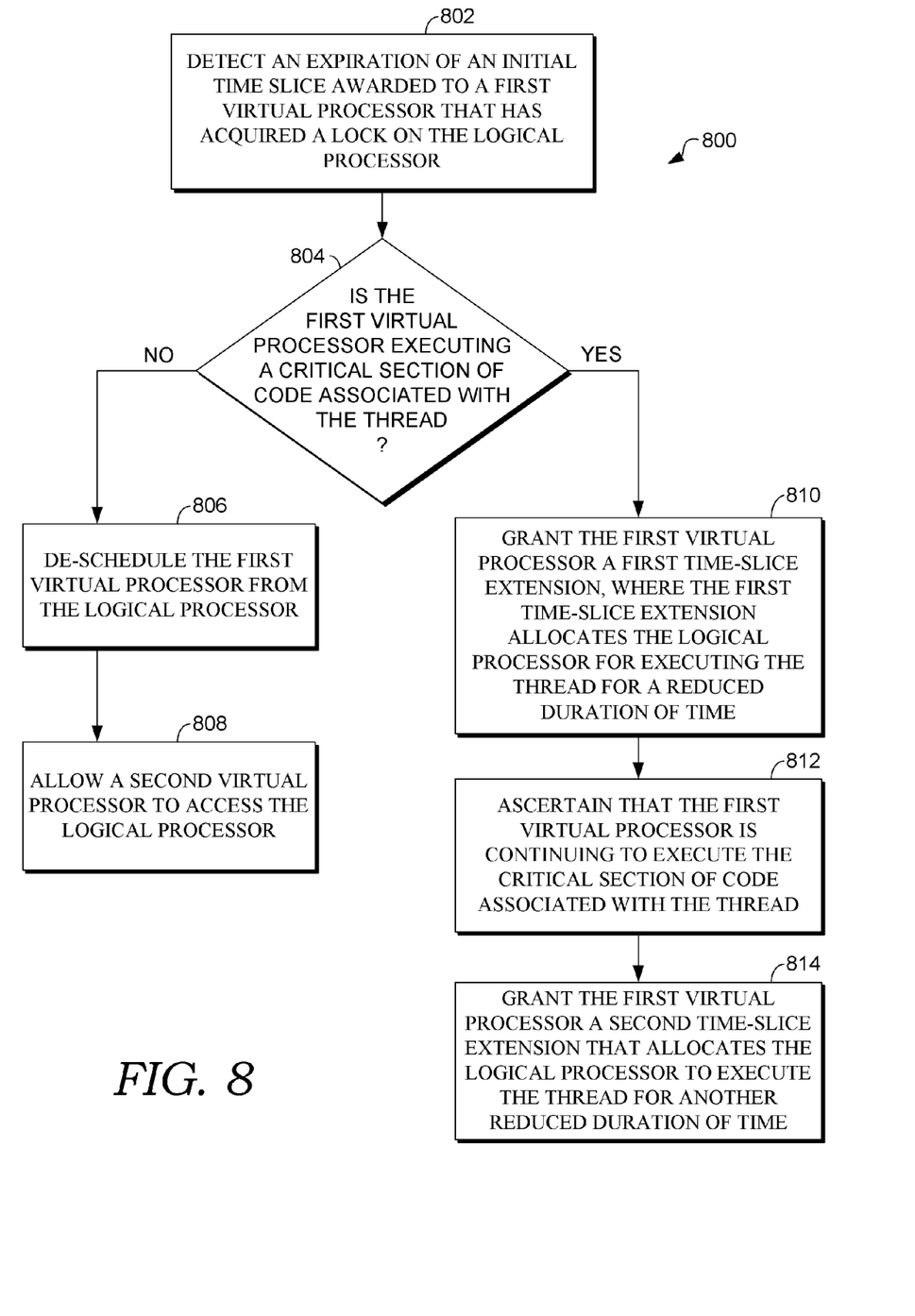
FIG. 8 is a flow diagram showing a front-end method for prolonging allocation of a logical processor to a virtual processor, in accordance with an embodiment of the present invention.

Turning now to FIG. 8, a flow diagram is shown that articulates a front-end method 800 for prolonging allocation of a logical processor to a virtual processor, in accordance with an embodiment of the present invention. Initially, the method 800 includes the step of detecting an expiration of an initial time slice awarded to the first virtual processor that has acquired a lock on the logical processor, as indicated at block 802. Typically, the initial time slice expires after the logical processor executes a thread, issued from the first virtual processor, for a predetermined duration of time. As indicated at block 804, a determination of whether the first virtual processor is executing a critical section of code associated with the thread is performed. When the determination indicates the first virtual processor is not executing the critical section of code, the method 800 may involve de-scheduling the first virtual processor from the logical processor (see block 806), and allowing a second virtual processor to access the logical processor (see block 808).

When the determination indicates that the first virtual processor is executing the critical section of code, the method 800 may involve granting the first virtual processor a first time-slice extension, as indicated at block 810. Generally, the first time-slice extension allocates the logical processor for executing the thread for a reduced duration of time. In an exemplary embodiment, the first time-slice extension is shorter in duration than the initial time slice. The method 800 may further include periodically inspecting the logical processor to ascertain whether the critical section of code is still being executed (see block 812), and, if so, granting additional time-slice extensions (see block 814).

Figure 9:
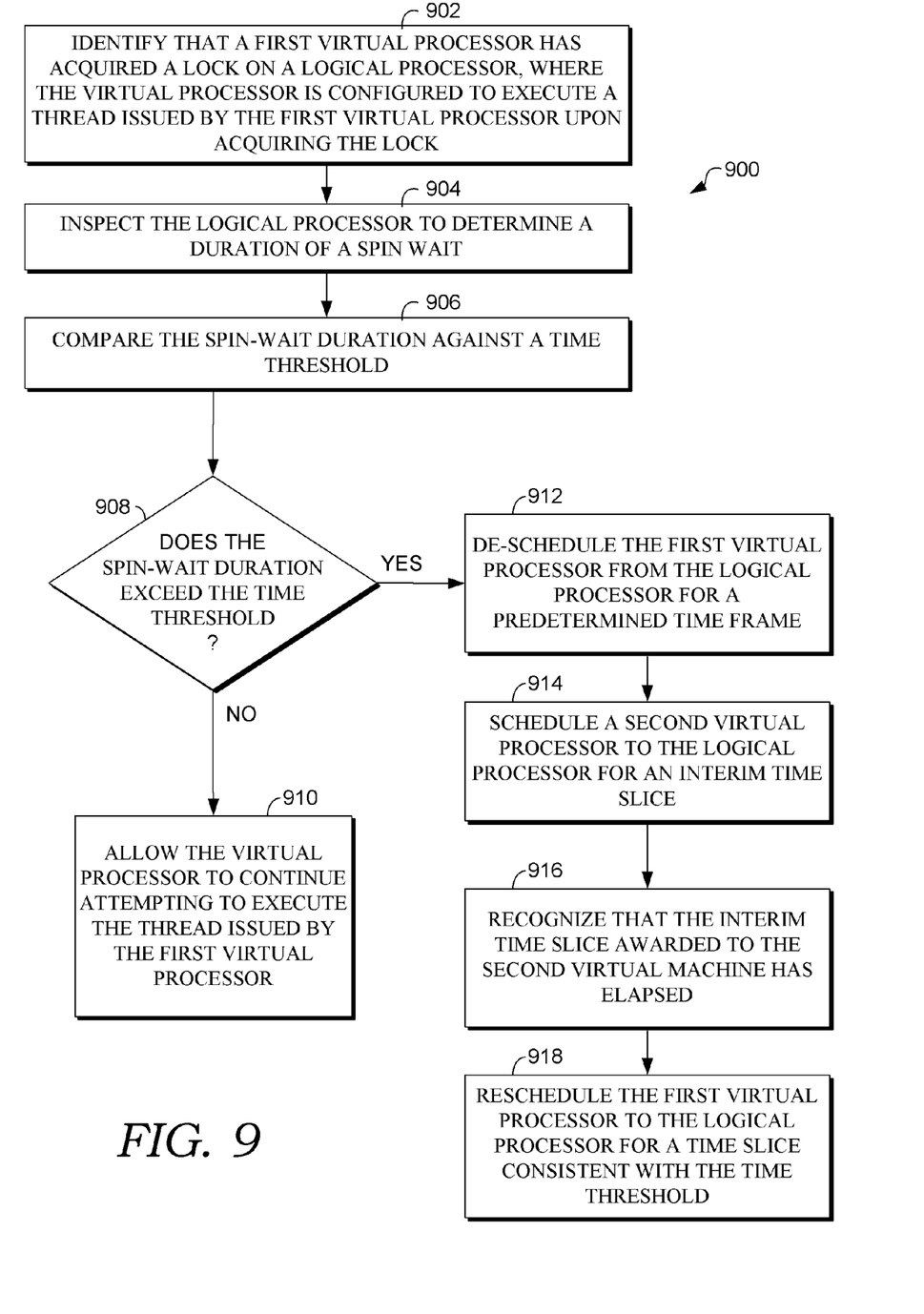
FIG. 9 is a flow diagram showing a back-end method for de-scheduling a first virtual processor from a logical processor upon acquiring a lock thereto, in accordance with an embodiment of the present invention.

Turning to FIG. 9, a flow diagram is illustrated that shows an embodiment of back-end method 900 for de-scheduling a first virtual processor from a logical processor, upon acquiring a lock thereto. At some point, the method 900 involves identifying that the first virtual processor has acquired a lock on the logical processor, as indicated at block 902. Typically, the virtual processor is configured to execute a thread issued by the first virtual processor upon acquiring the lock. The method 900 may further involve inspecting the logical processor to determine a duration of a spin wait, as indicated at block 904. As indicated at block 906, the spin-wait duration may be compared against a time threshold, where the time threshold may represent a predefined number of the nonproductive loops performed consecutively by the logical processor. As indicated at block 908, a determination of whether the spin-wait duration exceeds the time threshold is performed. When the spin-wait duration does not meet the time threshold, the virtual processor is allowed to continue attempting to execute the thread issued by the first virtual processor. This step is indicated at block 910.

When the spin-wait duration exceeds the time threshold, a scheduler may be employed to de-schedule the first virtual processor from the logical processor for a predetermined time frame, as indicated a block 912. Also, as indicated at block 914, the scheduler may schedule a second virtual processor to the logical processor for an interim time slice. As indicated at block 916, the scheduler may recognize that the interim time slice awarded to the second virtual machine has elapsed. At this point, the first virtual processor may be rescheduled to the logical processor for a time slice consistent with the time threshold. This step is indicated at block 918.

Embodiments of the present invention have been described in relation to particular embodiments, which are intended in all respects to be illustrative rather than restrictive. Alternative embodiments will become apparent to those of ordinary skill in the art to which embodiments of the present invention pertain without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer-storage memory having computer-executable instructions embodied thereon that, when executed, perform a front-end method for prolonging allocation of a logical processor to a first virtual processor, the method comprising:

detecting using a scheduler an expiration of an initial time slice awarded to the first virtual processor that has acquired a lock on the logical processor, wherein the initial time slice expires after the logical processor executes a thread, issued from the first virtual processor, for a predetermined duration of time;

ascertaining, using the scheduler, whether the first virtual processor is executing a critical section of code associated with the thread, wherein upon de-scheduling the first virtual processor, a second virtual processor becomes blocked, wherein the second virtual processor depends on complete execution of the critical section of code by the first virtual processor, wherein the critical section of code is identified based on receiving an indication of a level of importance of the thread corresponding to the critical section of code, the level of importance meeting a predefined threshold; and when the first virtual processor is executing the critical section of code that is blocking additional processing of at least the second virtual processor, granting the first virtual processor a first time-slice extension; and allocating the first time-slice extension to the logical processor for executing the thread for a reduced duration of time.

2. The one or more computer-storage memory of claim 1, wherein the method further comprises, when the first virtual processor is not executing the critical section of code:

de-scheduling the first virtual processor from the logical processor;

allowing the second virtual processor to access the logical processor, wherein allowing a second virtual processor to access the logical processor comprises granting the second virtual processor a subsequent time slice that allocates the logical processor to the second virtual processor for a predetermined duration of time.

3. The one or more computer-storage memory of claim 1, wherein a length of the reduced duration of time of the first time-slice extension is longer when the first virtual processor is associated with a local node and shorter when the first virtual processor is associated with a remote node.

4. The one or more computer-storage memory of claim 3, wherein the remote node is remotely located from the memory associated with the local node.

5. The one or more computer-storage memory of claim 4, further comprising, when the first virtual processor is associated with the remote node:

determining the availability of one or more logical processors within the local node, incident to an elapse of the first-time extension scheduled on the first virtual processor.

6. The one or more computer-storage memory of claim 1, wherein the method further comprises:

upon granting the first virtual processor the first time-slice extension, ascertaining whether the first virtual processor is continuing to execute the critical section of code associated with the thread; and when the first virtual processor is continuing to execute the critical section of code, granting the first virtual processor a second time-slice extension, wherein the second time-slice extension allocates the logical processor to execute the thread for another reduced duration of time.

7. The one or more computer-storage memory of claim 1, wherein ascertaining whether the first virtual processor is executing a critical section of code is based on an operating system determining a thread associated with the first virtual processor has a threshold task priority register value.

8. The one or more computer-storage memory of claim 1, wherein ascertaining whether the first virtual processor is executing a critical section of code is based on the logical processor is running a synchronizing region of code.

9. The one or more computer-storage memory of claim 1, the method further comprising:
  periodically inspecting the logical processor to determine whether the lock acquired by the first virtual processor is being held; and
  when the lock on the logical processor is identified as being released, arresting the periodic inspection and refraining from granting the first virtual processor an additional time-slice extension.

10. The one or more computer-storage memory of claim 1, wherein a length of the reduced duration of time associated with the first time-slice extension is based upon a priority level attached to the thread.

11. The one or more computer-storage memory of claim 1, wherein the method further comprises:
  monitoring a frequency at which time-slice extensions are granted to the first virtual processor;
  generating a pattern that reflects the frequency of granting the time-slice extensions; and
  applying the pattern to adjust the reduced duration of time associated with the time-slice extensions.

12. One or more computer-storage memory computer-executable instructions embodied thereon that, when executed, perform a front-end method for prolonging allocation of a logical processor to a first virtual processor, the method comprising:

detecting using a scheduler an expiration of an initial time slice awarded to the first virtual processor that has acquired a lock on the logical processor, wherein the initial time slice expires after the logical processor executes a thread, issued from the first virtual processor, for a predetermined duration of time, and wherein the predetermined duration of time of the initial time slice is based on a determination whether the first virtual processor is associated with a local node or a remote node such that a longer initial time slice is allocated when the first virtual processor is associated with the local node and a shorter initial time slice is allocated when the first virtual processor is associated with the remote node;

ascertaining using the scheduler whether the first virtual processor is executing a critical section of code associated with the thread; and when the first virtual processor is executing the critical section of code, (a) blocking, based on detecting the expiration of the initial time slice, a de-scheduling of a lock of the first virtual processor on the logical processor;

(b) granting the first virtual processor a first time-slice extension; and (c) allocating the first time-slice extension to the logical processor for executing the thread for a reduced duration of time.

* * * * *